FIG. 1 PRIOR ART

INVENTOR
YVES ROCARD

INVENTOR
YVES ROCARD

INVENTOR

YVES ROCARD

INVENTOR
YVES ROCARD

United States Patent Office 2,899,134
Patented Aug. 11, 1959

2,899,134

ELECTRICAL ANALOG COMPUTING SYSTEMS FOR SOLVING ORDINARY AND PARTIAL NON-LINEAR DIFFERENTIAL EQUATIONS

Yves Rocard, Paris, France, assignor to Compagnie Generale de Telegraphie Sans Fil, a corporation of France Application February 2, 1954, Serial No. 407,786

13 Claims. (Cl. 235—182)

This application is a continuation in part of the co-pending application Serial No. 177,231 filed on August 2, 1950, now abandoned.

It is known to use computors comprising impedance networks, having one or several dimensions, i.e., such that each point of these networks has one or several coordinates, for solving certain types of differential equations.

The number of dimensions of the network is equal to the number of variables.

The invention has for its object to provide improved networks of this type, capable of solving equations of the general type $$A_1\frac{\delta^2 V}{\delta x^2}+A_2\frac{\delta^2 V}{\delta y^2}+B_1\frac{\delta V}{\delta x}+B_2\frac{\delta V}{\delta y}+CV+E=0 \quad (1)$$

wherein $A_1$, $A_2$, $C$ and $E$ are functions of $x, y \ldots$, $B_1$ is proportional to $$\frac{\delta A_1}{\delta x}$$

and $B_2$ is proportional to $$\frac{\delta A_2}{\delta y}$$

The invention will be first explained with reference to single dimension netaworks i.e., a network capable of solving a differential equation of the first order of the general type:

$$A\frac{d^2V}{dx^2}+B\frac{dV}{dx}+CV+D=0 \quad (2)$$

wherein $A$, $C$ and $D$ are functions of $x$ and $B$ is proportional to $$\frac{dA}{dx}$$

It will then be known how the invention may be used with more than one variable.

The invention will be better understood from the ensuing description with reference to the accompanying drawings, in which.

Figure 1:
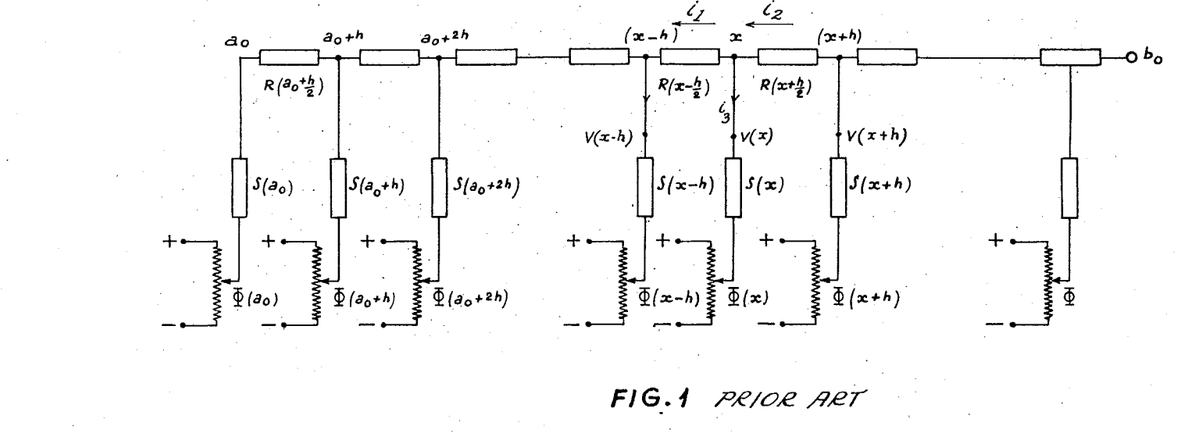
Fig. 1 shows a single dimension network of known type.

In Fig. 1 there can be seen a single dimension network of known type. This network comprises a certain number of resistances R in series. The points at which two resistances in series are connected will be termed the junction points.

The abscissae of the consecutive junction points are $$a_0, a_0+h \ldots a_0+ph=b_0$$

$a$, $p$ and $h$ are selected as functions of the problem to solve, as will be explained hereinafter.

Each junction point of abscissa $x$ $$x=a_0+kh$$

($k$ being an integer comprised between 0 and $p$) is therefore between two junction points: $x-h$ and $x+h$. The end points are respectively connected to two sources of voltage providing D.C. or A.C. potentials whose effective value is predetermined as a function of the problem to solve, as will be mentioned hereinafter.

Each junction point $x$ of the network which is not an end junction point is connected by an impedance S to a source of voltage $\varphi(x)$.

The impedance S is a capacitance, an inductance, a pure resistance or a complex impedance.

In a computor network of this type, described by Mr. Broc in his doctorate thesis for the University of Paris in June 1949, the values S are also chosen as a function of the problem to be solved. Thus R, S and $\Phi$ are functions of $x$.

The resistances R interconnecting junction points $x$ and $x+h$ reproduce a value of a function $R(x)$ which is obtained by substituting the value $$x+\frac{h}{2}$$

for $x$ in an expression $R(x)$.

Further, each node $x$ is connected to a source of voltage through a purely ohmic or complex impedance $S(x)$.

Thus the two resistances R on either side of a junction point of abscissae $x$ will be designated respectively by $$R\left(x-\frac{h}{2}\right) \text{ and } R\left(x+\frac{h}{2}\right)$$

By Kirchhoff's law the currents $i_1$ and $i_2$ in the resistors $$R\left(x-\frac{h}{2}\right) \text{ and } R\left(x+\frac{h}{2}\right)$$

respectively are:

$$i_1=\frac{V(x)-V(x-h)}{R\left(x-\frac{h}{2}\right)}$$

$$i_2=\frac{V(x+h)-V(x)}{R\left(x+\frac{h}{2}\right)}$$

$V(x)$, $V(x-h)$, $V(x+h)$ being the respective potentials at the respective junction points $x-h$, $x$, $x+h$.

Similarly a current $i_3$ flows through an impedance $S_x$, connected to a junction point of abscissae $x$ and, $$i_3=\frac{V(x)-\Phi(x)}{S(x)}$$

According to Kirchhoff's law it may be stated:

$$i_2-i_1=\frac{V(x+h)-V(x)}{R\left(x+\frac{h}{2}\right)}-\frac{V(x)-V(x-h)}{R\left(x-\frac{h}{2}\right)}$$

If $h$ is assumed to be sufficiently small relative to the two extreme values of $x$, so that it is possible to effect limited developments up to the first order of $h$, which is an essential condition in the use of the network in question, there is obtained:

(3) $\quad i_3 = i_2 - i_1 = h^2 \dfrac{d}{dx}\left[\dfrac{1}{R(x)} \dfrac{dV(x)}{dx}\right]$ This is shown in the following way by effecting a limited development up to the first order of $h$ of $$\dfrac{V(x) - V(x_0 - h)}{R\left(x_0 - \dfrac{h}{2}\right)}$$

and $$\dfrac{V(x_0 + h) - V(x)}{R_0\left(x_0 + \dfrac{h}{2}\right)}$$

it is obtained $$\dfrac{V(x_0 + h) - V(x_0)}{R\left(x_0 + \dfrac{h}{2}\right)} \sim \dfrac{h}{R(x_0)} \cdot \dfrac{dV(x_0)}{dx}$$

and $$\dfrac{V(x_0) - V(x_0 - h)}{R\left(x_0 - \dfrac{h}{2}\right)} \sim \dfrac{h}{R\left(x_0 - \dfrac{h}{2}\right)} \cdot \dfrac{dV(x_0 - h)}{dx_0}$$

It can be shown in the same manner that $$\dfrac{h}{R(x_0)} \cdot \dfrac{dV(x_0)}{dx} - \dfrac{h}{R(x_0 - h)} \cdot \dfrac{dV(x_0 - h)}{dx}$$
$$\sim h^2 \dfrac{d}{dx}\left[\dfrac{1}{R(x_0)} \cdot \dfrac{dV(x_0)}{dx}\right]$$

These developments are the first terms of series of Mac-Laurin type, see R. Langford-Smith: Radio Designers Handbook, Iliffe 6th edition, page 299.

$V$ is therefore the solution of the following differential equation:

(4) $\quad \dfrac{d}{dx}\left[\dfrac{1}{R(x)} \dfrac{dV}{dx}\right] - \dfrac{V(x)}{h^2 S(x)} + \dfrac{\Phi(x)}{h^2 S(x)} = 0$ For selecting the various values of the parameters which are functions of $x$, for instance R, S and $\Phi$ in the network of Mr. Broc, one proceeds in the following manner:

a. The limits within which the Equation 2 is to be solved are fixed.

b. Values $a_0$ and $a_0 + ph = b_0$ are fixed. As the network has a limited number of junction points this determines the value of $h$. The number of junction points must be sufficient for $h$ to be small compared to the difference $a_0 - b_0$.

c. The potential of the junction point $a_0$ is fixed at a value $Va_0$ and the potential of the junction and the potential of the junction point $b_0$ at value $Vb_0$; this fixes the limiting conditions of integration.

d. The two relations (3) and (4) are set equal to each other. In other words, there is written that for all the values of $x$ the respective coefficients of the members of these equations are identical.

This gives in the case of Mr. Broc's network:

$$A \equiv \dfrac{1}{R(x)}$$

$$B \equiv -\dfrac{1}{R^2(x)} \cdot \dfrac{dR}{dx} \equiv \dfrac{dA}{dx}$$

$$C = -\dfrac{1}{h^2 S(x)}$$

$$D = +\dfrac{\Phi(x)}{h^2 S(x)}$$

These relations permit calculation of the values of R, S and $\Phi$ at each junction point. This is what is called the simulation of the data.

Once this has been done, the potentials are measured at the different junction points. The latter reproduces the values of the desired function at different points $a_0, a_0 + h, \ldots a_0 + ph$ which are junction points, satisfying the conditions imposed.

The foregoing is well known. Such networks possess the following disadvantage.

If the impedance $$S(x) \text{ and } R\left(x + \dfrac{h}{2}\right)$$

are pure resistances, the sign of the coefficient of the term in V is always negative; in other words, only equations with the terms in V negative may be solved. To eliminate this disadvantage, the resistances R may be replaced by inductances, the S by capacitances. This seriously complicates the construction of such networks. It is in particular difficult to construct inductances whose values are strictly determined and exactly adjustable.

The invention has for its object to eliminate this restriction in simulating and solving the equation and thus solve equations of type (1) in which the terms in V may be positive without this causing the use of elements R other than purely ohmic.

Furthermore, as will be shown hereinafter, the invention provides other improvements, especially in so far as the simulating of the term having the coefficient C is concerned.

According to the invention, one proceeds in the following manner.

At each junction point there is connected an amplifier providing a feedback loop.

For instance, the input of this amplifier is connected to the junction point and the output of this amplifier is connected to the end of the impedance $S(x)$ opposed to that at which the latter is connected to the junction point. There is obtained at the output of the amplifier a voltage $\alpha(x)V(x)$, $\alpha(x)$ depending on the gain of the amplifier. As will be explained hereinafter $\alpha$ may be a function of $x$ and V is, as mentioned above, the potential at the junction point considered.

Thus at the terminals of the impedance S, a potential difference $P(x)$ is provided, such that:

$$P(x) = V(x) - [\Phi(x) + \alpha(x)V(x)]$$

It will be understood that P may be made either positive or negative.

Figure 2:
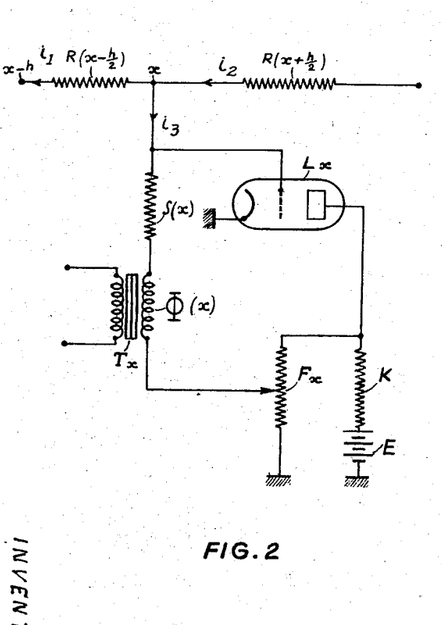
Figs. 2 and 3 show respectively two embodiments of the computer cells according to the invention.

Fig. 2 shows a first embodiment of the invention. $x$ is connected to two other junction points, $x+h$ and $x-h$, respectively by the resistors.

$$R\left(x - \dfrac{h}{2}\right) \text{ and } R\left(x + \dfrac{h}{2}\right)$$

The potential $\Phi(x)$; which may be D.-C. or A.-C. potential, is an A.-C. potential in the illustrated embodiment. It is supplied by the secondary of a transformer $Tx$. This secondary is connected to the junction point $x$ by a resistor S. The junction point $x$ is furthermore connected to the control grid of an electronic tube L. The cathode of this tube is earthed. The anode is positively biased by a source E to which it is connected by a resistor K. The voltage $\alpha V(x)$ depends on the gain of the tube. This voltage is received on the movable tap of a potentiometer $Fx$, which is bridge mounted between the anode and the earth. The parameter $\alpha$ is therefore adjustable by means of this potentiometer, and may be made a function of $x$.

Thus the respective voltages at the terminals of the resistance S are equal to $$\alpha V(x) + \Phi(x) \text{ and } V(x)$$

The current $i_3$ in the resistor $S(x)$ is:

$$i_3 = \frac{V(x) - [\alpha V(x) + \Phi(x)]}{S(x)}$$

The resolved equation becomes therefore by the same reasoning as that which gave the Equation 4:

(5)
$$\frac{d}{dx}\left[\frac{1}{R(x)}\frac{dV(x)}{dx}\right] + \frac{\alpha(x)-1}{h^2 S(x)}V(x) + \frac{1}{h^2 S(x)}\Phi(x) = 0$$

This equation is much more general than equation 4. In particular, by properly selecting the function $\alpha$, the sign of the coefficient of $V(x)$ may be varied. Moreover, with such a computer, $S(x)$ may be chosen constant, the coefficient of $V$ remaining a function of $x$.

There will now be described some other embodiments of the computer network according to the invention.

Figure 3:
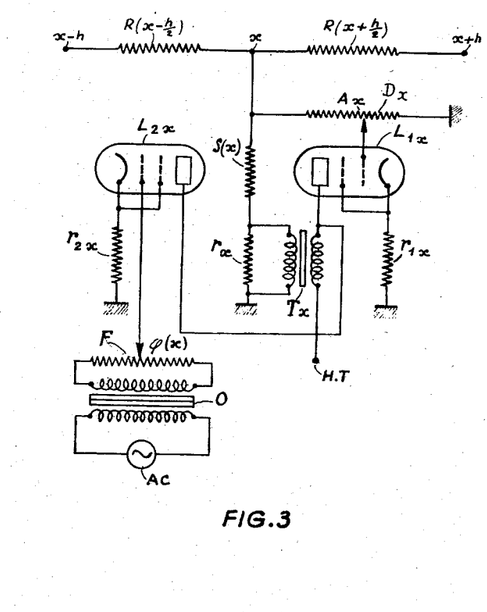

A first modification of a cell of such a computer is shown in Fig. 3. By the word cell, it is meant the assembly of circuits and resistors connected to the same junction point $x$.

This junction point $x$ is earthed through a potentiometer $Dx$. The movable tap $Ax$ of this potentiometer, the position of which may be made a function of $x$ provides a voltage which is equal to $\beta V(x)$, where $\beta$ is less than 1 and is a function of $x$. This point $Ax$ is connected to the control grid of a pentode $L_1x$, the cathode of which is connected earthed through a resistor $r_1(x)$.

The anode of this pentode is connected to a source of high tension HT through the primary of a transformer $Tx$. This anode is connected, furthermore, directly to the anode of another pentode $L_2x$. The secondary of transformer $Tx$ is connected in series between resistor $Sx$ and junction point $x$. A resistor $r_x$ is mounted in parallel with said secondary.

The cathode of the pentode $L_{2x}$ is connected to earth through a resistor $r_{2(x)}$. The control grid of the tube $L_{2x}$ is connected to one point on a potentiometer F. This potentiometer is feeding from the secondary of a transformer 0. The primary of this transformer is fed by a source of alternating current A.-C. The voltage supplied to the grid of the tube $L_{2x}$ is a voltage $\varphi(x)$ which is a function of $x$.

The tube $L_{1x}$ has a mutual conductance $g_{m1}$. Let $V_c$ be the potential of its cathode. This gives $V_c = r_{1(x)}I_1$, where $I_1$ is the current in the tube $L_{1x}$. Further, $I_1$ is given by the relation:

$$I_1 = g_{m1}[\alpha(x)V(x) - V_c]$$
$$= g_{m1}[\alpha(x)V(x) - r_{1(x)}I_1]$$

From which $$I_1 = \frac{\alpha(x)V(x)}{1 + g_{m1}r_{1(x)}}g_{m1}$$

$r_1(x)$ may be taken as $$g_{m1}r_1(x) \gg 1$$

which gives $$I_1 \sim \alpha(x)\frac{V(x)}{r_1(x)}$$

Similarly, the pentode $L_2x$ which receives at its grid a voltage $\varphi(x)$, gives under the same condition a current $I_2$ $$I_2 \sim \frac{\varphi(x)}{r_2(x)}$$

The primary of the transformer $T_x$ has therefore a current $I_1 + I_2$.

The secondary of this transformer is feeding a resistor $r(x)$.

The voltage across this resistor is:

$$P(x) = nr(x)(I_1 + I_2)$$

where $n$ is the transformer ratio. It is advantageous to select a low value for $r(x)$ and a high one for $n$.

In this case the voltage drop in the resistance $r(x)$ is small and may be neglected. One of the terminals of this resistor is connected by the resistor $S(x)$ to the junction point $x$, the other being earthed. The current flowing in the resistor $S(x)$ is:

$$i_3 = \frac{V(x) - r(x)n(I_1 + I_2)}{S(x)}$$

or, in replacing $I_1$ and $I_2$ by their respective values:

$$i_3 = \frac{V(x)\left[1 - n\alpha(x)\frac{r(x)}{r_1(x)}\right] - n\frac{r(x)}{r_2(x)}\varphi(x)}{S(x)}$$

Now it has been seen that in applying Kirchhoff's law there is obtained: $i_3 = i_2 - i_1$ where $i_2$, and $i_1$ are respectively the currents in the resistances $$R\left(x - \frac{h}{2}\right) \text{ and } R\left(x + \frac{h}{2}\right)$$

It has also been shown that $i_2 - i_1$ was equal to the expression:

$$i_2 - i_1 = h^2 \frac{d}{dx}\left[\frac{1}{R(x)}\frac{dV}{dx}\right]$$

or $$i_2 - i_1 = h^2 \frac{d}{dx}\left[a(x)\frac{dV}{dx}\right] \quad (6)$$

where $$a(x) = \frac{1}{R(x)}$$

The advantage of the system shown in Fig. 3 over that shown in Fig. 2 is as follows. Instead of using a special transformer 0 for each junction point to obtain the voltage $\theta(x)$, there can be used a single transformer 0, which supplies all the junction points through the medium of respective amplifiers $L_2x$, the gain of which is adjusted for each junction point in such manner as to obtain the desired voltage $\theta(x)$.

The transformers $Tx$ where the voltages $\alpha(x).V(x)$ and $\theta(x)$ are added are all identical.

The computer network shown in Fig. 3 permits equations of the form (4) to be solved, since they may be put in the form:

(7)
$$\frac{d}{dx}\left[a(x)\frac{dV}{dx}\right] - \frac{V(x)\left[1 - n\alpha(x)\frac{r(x)}{r_1(x)}\right] - n\frac{r(x)}{r_2(x)}\varphi(x)}{h^2 S(x)} = 0$$

To render the description more precise, it will now be shown, by taking a concrete example, how the simulation and the solution of differential equations are effected with the aid of the computer shown in Fig. 3.

It will be assumed that the following equation is to be solved:

$$\frac{d^2V}{dx^2} + \frac{2}{x}\frac{dV}{dx} + \left(\frac{1}{x_0^2} - \frac{1}{x^2}\right)V(x) - \frac{\phi(x)}{x_0^2} = 0 \quad (8)$$

This is an equation of the type of the Equation 4, in which $x_0$ is a real constant.

To simplify, it will be written that:

$$\frac{1}{R(x)} = a(x)$$

where $a(x)$ is the admittance of the resistance $R(x)$.

It is therefore necessary to set equal to each other the two Equations 7 and 8.

This gives:

$$\frac{d^2V}{dx^2}+\frac{2}{x}\frac{dV}{dx}+\left(\frac{1}{x_0^2}-\frac{1}{x^2}\right)V(x)-\frac{\phi(x)}{x_0^2}=0 \quad (8)$$

$$\frac{d^2V}{dx^2}+\frac{d[a(x)]}{dx}\cdot\frac{dV(x)}{dx}\cdot\frac{1}{h^2a(x)}$$

$$-\frac{1}{h^2a(x)}\left[\frac{V(x)\left[1-na(x)\frac{r(x)}{r_1(x)}-n\frac{r(x)}{r_2(x)}\varphi(x)\right]}{S(x)}\right]=0$$

By identifying the terms in $$\frac{dV}{dx}$$

there is obtained:

$$\frac{da}{a(x)}=\frac{2dx}{x}$$

From this $$a(x)=Cx^2$$

where C is a constant.
In assuming $$\frac{1}{C}=Rh^2$$

there is obtained:

$$R(x)=\frac{1}{Cx^2}=\frac{Rh^2}{x^2} \quad (9)$$

By identifying the terms in V there is obtained:

$$\frac{1}{x_0^2}-\frac{1}{x^2}\equiv\frac{R}{x^2}\left[1-na(x)\frac{r(x)}{r_1(x)}\right]\frac{1}{S(x)}$$

From this $$\frac{1}{x^2}\equiv\frac{R}{x^2}\cdot\frac{1}{S(x)}$$

and which becomes $$S(x)=R \quad (10)$$

Furthermore, from the above equation:

$$\frac{x^2}{x_0^2}\equiv na(x)\frac{rx}{r_1x} \quad (11)$$

By identifying the independent terms in V, there is obtained:

$$n\frac{r(x)}{r_2(x)}\varphi(x)\equiv\frac{x}{x_0^2}\phi(x) \quad (12)$$

Which gives $\varphi(x)$ as a function of $\phi(x)$.

Figure 4:
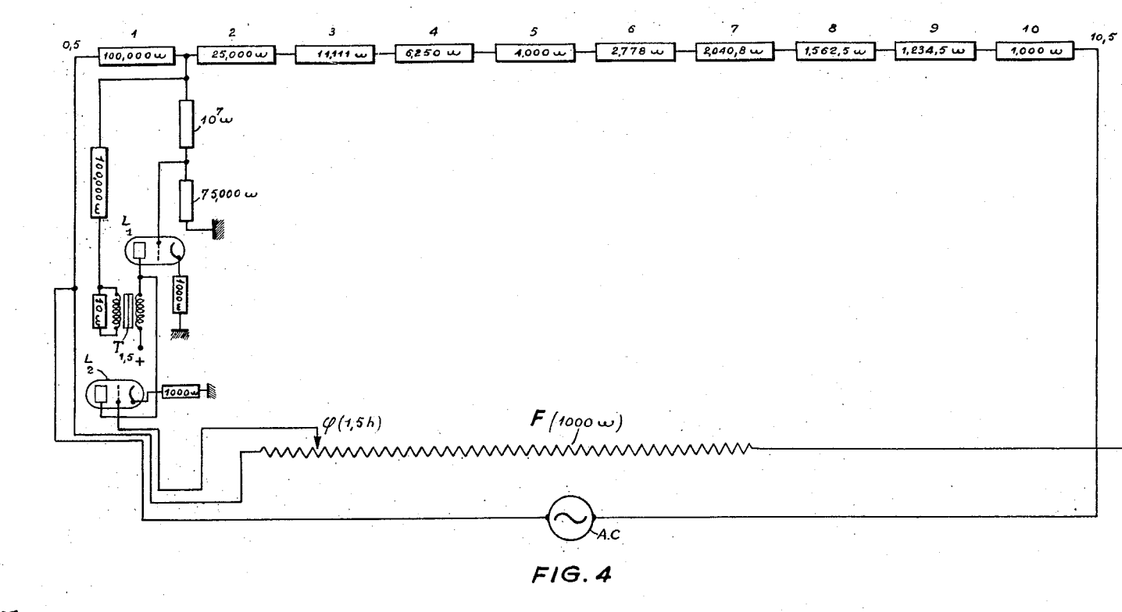
Fig. 4 shows diagrammatically a computer network according to the invention.

Fig. 4 shows a computer network formed of cells of the type shown in Fig. 3 in which the Equation 7 is simulated, said network having 11 junction points.

Given $x_1$ and $x_{11}$, the two values in $x$ relating to the end junction point of the series.

Thus, $$h=\frac{x_{11}-x_1}{10}$$

The values of $x_1$ and $x_{11}$ determine the limits within which the Equation 8 is integrated. The voltages at $x_1$ and $x_{11}$ which are predetermined give the limiting conditions of the equation.

From Equation 9 it may be seen that the ten resistors reproduce the values of the function $$R(x)=R\frac{(x_{11}-x_1)^2}{100}\cdot\frac{1}{x+\left(\frac{x_{11}-x_1}{20}\right)^2}$$

where $x$ has all the values $$x_1+p\frac{x_{11}-x_1}{10}$$

and $p$ represents all the integers between 0 and 10. It has been stated above that a resistor connecting a junction point $x$ to a junction point $x+h$ is written $$R\left(x+\frac{h}{2}\right)$$

In Fig. 4 the various resistors have the following values:

|  | Ohms |
|---|---|
| $R_1$ | 100,000 |
| $R_2$ | 25,000 |
| $R_3$ | 11,111 |
| $R_4$ | 6,250 |
| $R_5$ | 4,000 |
| $R_6$ | 2,778 |
| $R_7$ | 2,040.8 |
| $R_8$ | 1,562.5 |
| $R_9$ | 1,234.5 |
| $R_{10}$ | 1,000 |

These values are obtained in dividing 100,000 ohms by the series of the squares of whole numbers 1, 2, 3, 4 ... 9, 10.

This is the same as saying that the successive values of $$xp+\frac{x_{11}-x_1}{20}=x_1+p\frac{x_{11}-x_1}{10}+\frac{x_{11}-x_1}{20}=x_1+\frac{2p+1}{20}(x_{11}-x_1)$$

are 1, 2, 3, 4, 5, 6, 7, 8, 9 and 10 and that R=100,000 ohms.

The abscissae of the eleven junction points are therefore

| $x_1$ | 0.5 |
|---|---|
| $x_2$ | 1.5 |
| $x_3$ | 2.5 |
| $x_4$ | 3.5 |
| $x_5$ | 4.5 |
| $x_6$ | 5.5 |
| $x_7$ | 6.5 |
| $x_8$ | 7.5 |
| $x_9$ | 8.5 |
| $x_{10}$ | 9.5 |
| $x_{11}$ | 10.5 | and $h$ is equal to 1.

The Equation 11 shows that $n$, $r$ and $r_1$ may be chosen constant, $\alpha(x)$ being then a function of the type $\alpha(x)=\gamma x^2$, $\gamma$ being a constant $$\gamma=\frac{r_1}{nrx_0^2}$$

This shows that in all the junction points identical transformers $Tx$ may be used, as mentioned above.

If it is desired that all the tubes $L_1x$ be identical, it is necessary that they be widely dimensioned, since under the conditions assumed, $x$ varying from 1 to 10, $\alpha$ varies to the extent of 1 to 100, i.e., the grid voltage varies from 1 to 100 according to the junction point.

It is also possible to render $r(x)$ proportional to $x$, $\alpha$ becoming then also proportional to $x$, $\alpha=\alpha_0 x$, $\alpha_0$ being constant.

$r(x)=kx$, $k$ being also constant

It is possible for example to find two identical pentodes $L_1$ and $L_2$ having gm. equal to 10 ma. per volt.

Taking $r_1=r_2=1,000$ ohms $$gm.=\frac{1}{100} \text{ which gives gm. } r_1=10$$

In writing $r(x)=kx$, and in assuming $k=20$, there is obtained at the respective junctive point $x_1 r=20\times 0.5=10$ ohms
$x_2 r=20\times 1.5=30$ ohms
$x_3 r=20\times 2.5=50$ ohms
$x_4 r=20\times 3.5=70$ ohms
$x_5 r=20\times 4.5=90$ ohms
$x_6 r=20\times 5.5=110$ ohms
$x_7 r=20\times 6.5=130$ ohms $$x_8r=20\times7.5=150 \text{ ohms}$$
$$x_9r=20\times8.5=170 \text{ ohms}$$
$$x_{10}r=20\times9.5=190 \text{ ohms}$$
$$x_{11}r=20\times10.5=210 \text{ ohms}$$

All these values are such that $r \ll R$, R being equal to 100,000 ohms.

The transformer ratio $n$ of all the transformers T may be made equal to 100. The ratio $\alpha$ is then determined by $$\frac{r}{r_1}n\alpha=\frac{20x\cdot 100}{1000h}\alpha=\frac{x^2}{x_0^2}$$

Equation 11. This gives $$\alpha=\frac{1}{2}h\frac{x}{x_0^2}$$

here it is assumed that $$h=1$$

Taking $r=1,000$ ohms there is obtained $$\alpha=\frac{x}{2x_0^2}$$

$\alpha$ determines the position of the point $Ax$ on the corresponding potentiometer.

The Equation 12

$$\frac{r}{r_2}n\alpha(x)=\frac{x^2}{x_0^2}$$

fixes the voltages to be respectively applied to the grids of the tubes $L_2$ of the different junction points. As the function $\phi$ is a known function, the voltages are obtained by adjusting the potentiometer F. Thus the function $\phi(x)$ is simulated by the computer.

Now:

$$r=1,000 \text{ ohms}$$
$$r(x)20x \text{ ohms}$$
$$n=100$$

from this $$\varphi(x)=\frac{x}{2x_0^2}\phi(x)$$

$\varphi(x)$ is known, and the potentiometer $Fx$ permits the simulation of this function $\Phi(x)$.

Fig. 4 shows the arrangement of the computor as a whole for $h=1$ and $x_0=100$.

There is only one potentiometer F which is used for adjusting the potential applied to the grids of the tubes $L_2x$. This single potentiometer is of 1,000 ohms and is fed by the main voltage source A.C. The latter supplies the two given fixed voltages $Vx_1$ and $Vx_{11}$ at the ends of the chain of resistors R. These voltages simulate the limit conditions of the integration of the equation to be solved.

It has been seen above that the potentiometer F is used for simulating the function $\phi(x)$. Similarly, the position of the tap A at each junction point (which position controls the value $\alpha$) is used to simulate the given value $x_0$.

In the foregoing it has been assumed that $h=1$; in other words, if $x$ and $x_0$ correspond to lengths, $h$ is the unity which serves to measure them.

Figure 5:
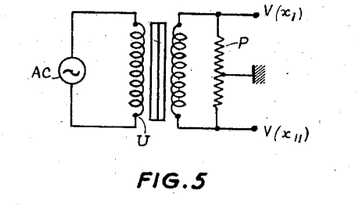
Figs. 5 and 6 show two types of devices for feeding the extreme junction points of the computor network.
Figure 6:
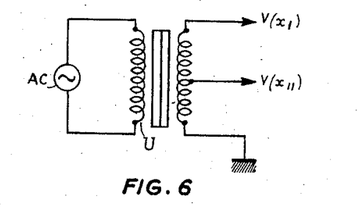

Figs. 5 and 6 show how the potentials $V(x_1)$ and $V(x_{11})$ are adjusted relative to earth. The main source A.C. supplies the primary of a transformer U. In the case of Fig. 5, the secondary is bridged by a resistor P and one of the terminals of this resistor is earthed. In this way the ratio $$\frac{V(x_{11})}{V(x_1)}$$

may be either positive or negative.

In the case of Fig. 6 one of the terminals of the secondary is connected to earth.

Figure 7:
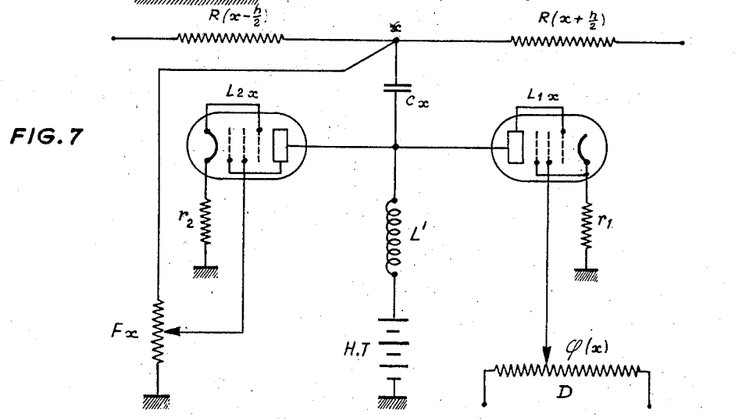
Figs. 7 and 8 show another embodiment of the cell of the computor network according to the invention.

Fig. 7 shows another modification of the cell according to the invention.

The junction point $x$ is connected through the medium of a capicity $Cx$ to the anode of a pentode $L_1x$. This anode is also connected to a high tension source through a choke $L'$. The control grid is connected to a potentiometer D fed by the mains. This grid has therefore a potential $\varphi(x)$. The cathode is earthed through the resistor $r_1(x)$.

The junction point $x$ is earthed through a potentiometer $Fx$.

The movable tap of this potentiometer is connected to the control grid of a tube $L_2x$ which is similar to the tube $L_1x$. The anode of this tube is connected to the anode of the tube $L_2x$. The cathode is earthed through a resistor $r_2(x)$.

By a similar reasoning to that above, these two tubes create respectively in the capacity $Cx$ a current $$\frac{\varphi(x)}{r_1(x)}$$

for the tube $L_1x$, and a current $$\frac{\alpha(x)V(x)}{r_2(x)}$$

for the tube $L_2x\alpha(x)$ being determined by the position of the tap of the potentiometer $Fx$.

Indeed, the current $i_3$ in the capacity $Cx$ flows toward the earth through the tube $L_1x$ and the resistor $r_1(x)$ and furthermore, through the tube $L_2x$ and the resistor $r_2(x)$ the coil $L'$ opposing thereto an infinite impedance.

It is supposed that $gm_1\ r_1$ and $gm_2\ r_2$ are respectively much greater than 1; the current flowing across the capacitance $Cx$ is $$i_3=\alpha(x)\frac{V(x)}{r_2}+\frac{\varphi(x)}{r_1}$$

$r_1$ and $r_2$ can be independent of $x$.

The resolved equation is therefore:

$$\frac{d^2V}{dx^2}+\frac{1}{a(x)}\frac{da}{dx}\frac{dV}{dx}=\frac{1}{h^2a(x)}\left[\frac{\alpha(x)V(x)}{r_2}+\frac{\varphi(x)}{r_1}\right] \quad (13)$$

the coefficient $\alpha(x)$ is simulated by the tap of the potentiometer $Fx$.

Figure 8:
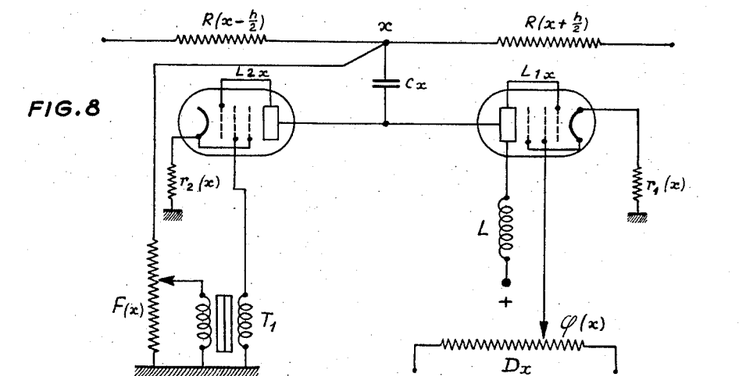

In the above case $\alpha(x)$ is necessarily positive. Fig. 8 shows an assembly similar to that shown in Fig. 7 in which $\alpha$ may be either positive or negative.

The assembly is identical to that shown in Fig. 7, except that the grid of tube $L_2x$ is connected to one terminal of the secondary of a transformer $T_1$, the other terminal of which is earthed. This transformer can inverse the sign of the term $\alpha(x)$.

The primary of this transformer has one terminal earthed and the other connected to the movable tap of the potentiometer $Fx$.

None of the transformers used in the foregoing examples must introduce parasitic dephasing. It is thus necessary to use transformers suitable for the frequencies utilised and practically free from any loss.

Figure 9:
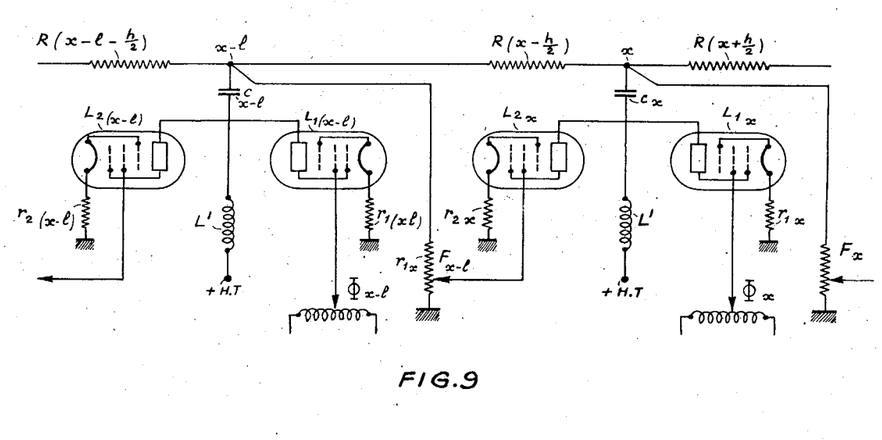
Fig. 9 shows a combination of two cells of the computor network of the invention.

In Fig. 9 there is diagrammatically shown a computer in which each feedback loop is not closed at a single junction point as in the preceding examples. The feedback occurs between one junction point and another. In other words, a part of the potential of a junction point $x$ is feedback to a junction point $x-l$, $l$ being equal to $qh$, $q$ being a positive or negative integer. This integer $q$ is of course the same for all the junction points of the network. If, for example, $q$ is assumed positive, the junction point $x_1$ is connected to the junction point $x_1+qh$, the junction point $x_2=x_1+h$ is connected to the junction point $x_2+qh$, i.e., $x_1+(q+1)h$ etc.

In the network shown, the arrangement is analogous to that of the Figure 7.

The grid of the tube $L_2x$ is connected to the tap of a potentiometer $F(x-l)$. This potentiometer is, however, connected to the junction point $x-l$.

It can be shown that the resolved equation is of the form:

$$\left(\frac{d^2V}{dx^2}\right)_x + \left[\frac{1}{a(x)}\frac{da}{dx}\left(\frac{dV}{dx}\right)_x\right]$$
$$= \frac{1}{h^2 a(x)}\left[\frac{\alpha(x-l)V(x-l)}{r_2(x)} + \frac{\varphi(x)}{r_1(x)}\right] \quad (14)$$

This represents a functional differential equation. This equation is derived from Equation 13, by replacing $\alpha(x) V(x)$ by $(x-l) V(x-l)$.

Figure 10:
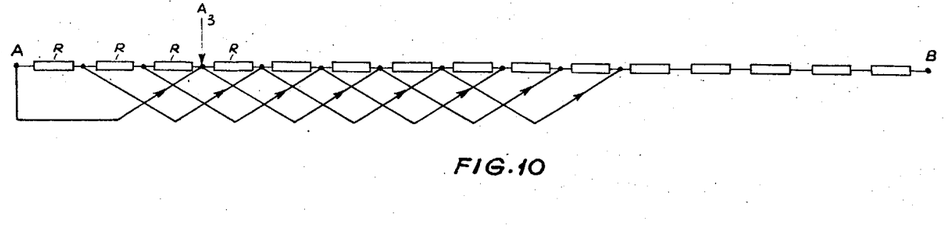
Fig. 10 shows the general arrangement of the computor composed of cells according to that shown in Fig. 9.

Fig. 10 shows diagrammatically the general arrangement of such a computer.

In this figure there has been shown the chain of resistors which connects the junction point $Ao$ $(x_1)$ and the junction point $Bo$ $(x_n)$. The feedback between a junction point $x-l$ and a junction point $x$ is designated by an arrow: $l$ being assumed equal to $3h$. It will be noticed that in the present case, three junction points, namely the junction points $x_1, x_1+h$ and $x_1+2h$ have no feedback. The computer therefore operates correctly only from the points $A_3$ $(x+3h)$ and $B$. The limiting conditions should be $V(A_3)$ and $V(B)$ and not $V(A)$ and $V(B)$.

Thus means should be provided for adjusting $V(A_3)$ starting from the votage supplied at A. Such means is known per se and there is no necessity to enlarge upon this subject.

In all the above-described computers, means are necessary for reading the value and sign of the voltage $V(x)$ at the junction points. The power supply may be in general direct current. In this case the potential of the junction points are continuous and a voltmeter is all that is necessary. Any switching device known per se, enables this voltmeter to be switched from one junction point to another.

If the computer is supplied with alternating current, which is the case of the computer shown in Figs. 3, 4 and 6 for example, the problem is rather more complicated. The potentials at points where function $V(x)$ is negative then opposite in phase to the general supply voltage and a conventional voltmeter cannot be used, since it would indicate an effective voltage, which is always positive.

Figure 11:
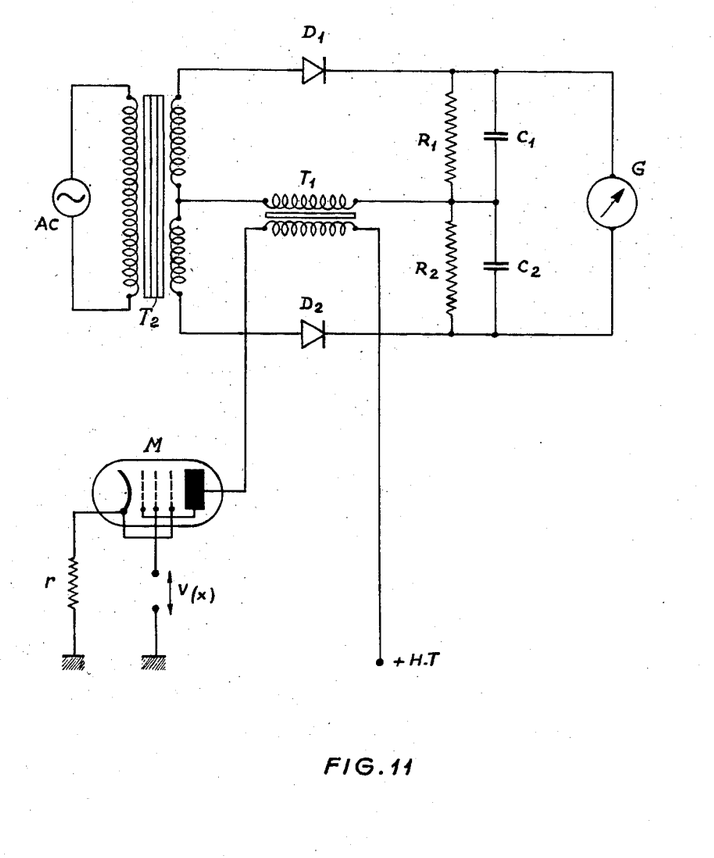
Fig. 11 shows a potential indicating device for the network according to the invention.

Fig. 11 shows diagramatically one example of an assembly whereby the sign of the function $V(x)$ may be determined.

The voltage $V(x)$ is applied between the earth and the control grid of a pentode M the cathode of which is connected to earth by a resistor $r$. The anode of this tube is connected to a terminal of the primary of a transformer $T_1$ the other terminal of this primary, which acts as a choke coil, being connected to the high tension source.

The first terminal of the secondary of the transformer $T_1$ is connected to the mid-point of the secondary of a transformer $T_2$, the primary of which is supplied by the mains. The two end terminals of the secondary of the transformer $T_2$ are connected, respectively to the inputs of identical rectifiers $D_1$ and $D_2$. The outputs of these rectifiers are interconnected by two identical series connected resistors $R_1, R_2$ and by two identical series connected capacitors $C_1$ and $C_2$ and by the galvanometer G which has a high input impedance.

The second terminal of the secondary of the transformer $T_1$ is connected to the common terminals of the resistors $R_1$ and $R_2$ and, furthermore, to those of the capacitors $C_1$ and $C_2$.

There are received at the two terminals of the secondary of the transformer $T_1$ two equal voltages $a \sin \omega t$ and $-a \sin \omega t$, which are opposite in sign.

There is received at the terminals of the secondary of the transformer $T_2$ the voltage $b \sin \omega t$ by the source A.C. which is proportional to $V(x)$ and has the same sign. It will be assumed that the resistor $R_1$ and $R_2$ and the capacitors $C_1$ and $C_2$ constitute circuits having a large time constant.

The voltage measured by the voltmeter G will therefore be the mean value of the expression $$(a \sin \omega t + b \sin \omega t)^2 - (b \sin \omega t - a \sin \omega t)^2$$

The mean value of this expression is $2ab$. This voltage is therefore equal in value and sign, apart from the ratio of the transformer $T_1$, to $V(x)$.

As already mentioned, the invention may be applied to the case of resistor network having several dimensions. By the way of example it will now be shown how the invention may be applied to a two dimension network.

Figure 12:
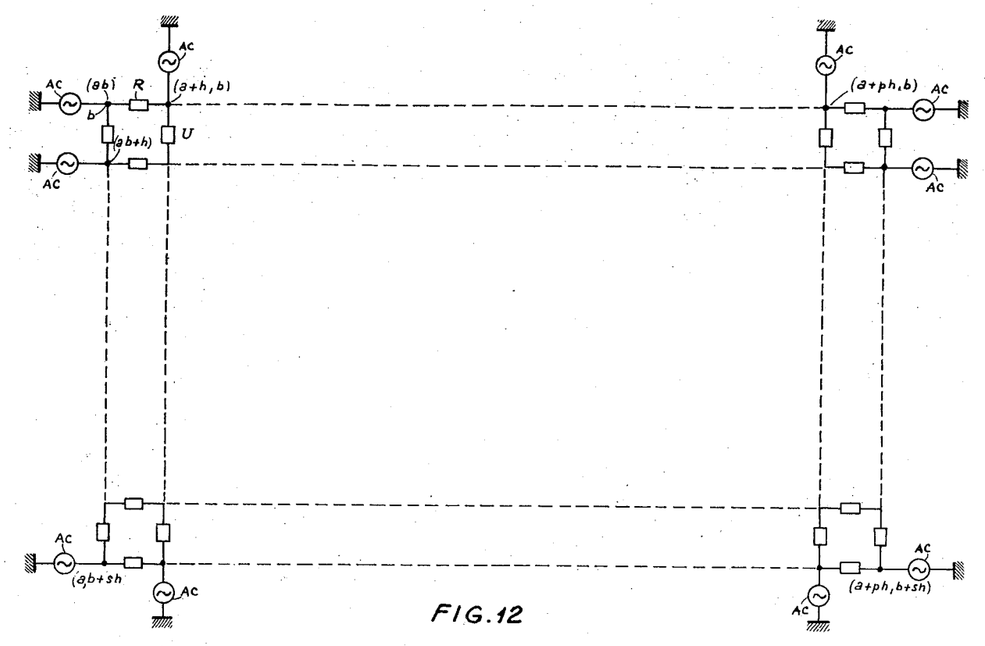
Fig. 12 shows diagrammatically a two dimension calculating network.
Figure 13:
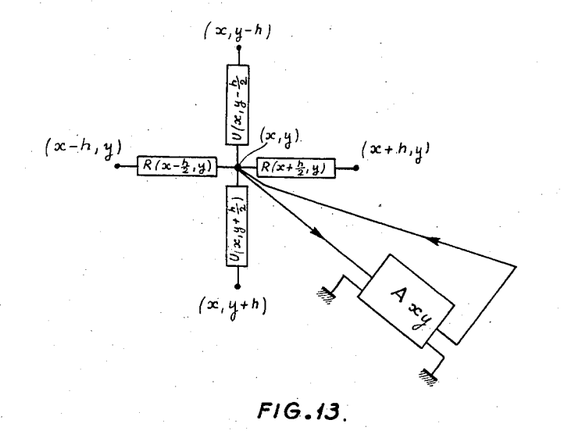
Figs. 13 and 14 show a detail of the above network.

Fig. 12 shows such a network, and Fig. 13 a detail of said network.

In such a network the junction points are defined by the intersection of a regular square pattern. This square pattern covers in the Fig. 12 a rectangle. Each junction point is characterized by its abscissa $x$ and its ordinate $y$.

The abscissae of the various consecutive junction points are therefore:

$$a, a+h \ldots a+ph$$

The ordinates of these junction points are:

$$b, b+h \ldots b+sh$$

$a, b, p, s$ and $h$ depend on the problem to be solved as was mentioned in the case of a single dimension network.

Each junction point of coordinate $x, y$; $x=a+lh$, $y=a+mh$ etc; ($l$ and $m$ being two integers less than $p$ and $s$ respectively), is between junction points of coordinates $(x+h, y)$, $(x-h, y)$ on the horizontal line and $(x, y-h)$, $(x, y+h)$ on the vertical line.

As in the case of a single dimension network, the potentials of the junction points of the rectangular contour are each connected directly to sources of voltages furnishing D.C. or A.C. potentials whose effective values are predetermined.

The junction point $x, y$ (Fig. 13) is connected to the junction points $x-h, y$ by the resistances $$R\left(x-\frac{h}{2}, y\right)$$

to the junction point $(x, y+h)$ by the resistances $$U\left(x, y+\frac{h}{2}\right)$$

selected in manner similar to that in which the resistors shown in Fig. 1 were selected but as a function of the two variables $x$, and $y$. The function $R(x, y)$ is therefore a function having two variables.

Any junction point of the network which is not an end junction point may be associated with a cell $Ax$ such as that shown in previous Figs. 3, 6 or 7 for example).

But, in this case, the elements of the cell which are a function of the position coordinates of the junction point in the network are selected not only as a function of $x$ but as a simultaneous function of $x$ and $y$.

Figure 14:
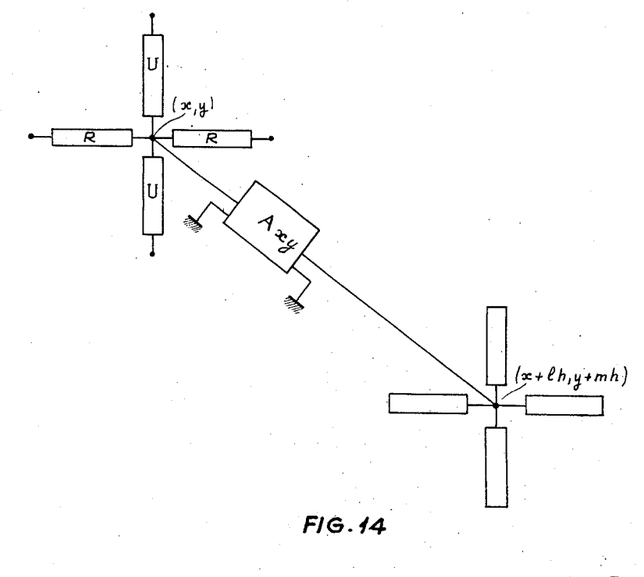

Similarly, in using an assembly similar to that shown in Fig. 14 a junction point $(x+lh, y+mh)$ may be associated with each junction point $xy$, $l$ and $m$ being two integers which are less than $p$ and $s$ respectively, and solve an equation of the form, $$h^2\left[\frac{\delta^2 V}{\delta x^2} + \frac{1}{a(x,y)}\frac{\delta a}{\delta x}\frac{\delta V}{\delta x}\right]$$
$$+ h^2\left[\frac{\delta^2 V}{\delta y^2} + \frac{1}{b(x,y)}\frac{\delta b}{\delta x}\frac{\delta V}{\delta y}\right]$$
$$= \frac{\alpha(x)}{r_2}V(x+lh, y+mh) + \frac{\varphi(x,y)}{r_1} \quad (15)$$

this case is shown (Fig. 14) A cell $Ax$ of the type of that of Figure 9 may be used.

Of course, at each node of coordinates $x$ and $y$ are flowing four currents $i_1$, $i_2$, $i_3$ and $i_4$, or $$i\left(x-\frac{h}{2}, y\right), i\left(x, y-\frac{h}{2}\right), i\left(x+\frac{h}{2}, y\right), i\left(x, y+\frac{h}{2}\right)$$

and in the same way as in a rectilinear network, there is obtained:

$$i_1 = i\left(x-\frac{h}{2}, y\right)$$
$$= \frac{V(x-h, y) - V(x, y)}{R\left(x-\frac{h}{2}, y\right)} \sim \frac{h}{R\left(x-\frac{h}{2}, y\right)} \cdot \frac{\delta V(x-h, y)}{\delta x}$$

$$i_2 = i\left(x+\frac{h}{2}, y\right)$$
$$= \frac{V(x, y) - V(x+h, y)}{R\left(x+\frac{h}{2}, y\right)} \sim \frac{h}{R\left(x+\frac{h}{2}, y\right)} \cdot \frac{\delta V(x, y)}{\delta x}$$

$$i_3 = i\left(x, y-\frac{h}{2}\right)$$
$$= \frac{V(x, y-h) - V(x, y)}{U\left(x, y-\frac{h}{2}\right)} \sim \frac{h}{U\left(x+\frac{h}{2}, y\right)} \cdot \frac{\delta V(x, y-h)}{\delta y}$$

$$i_4 = i\left(x, y+\frac{h}{2}\right)$$
$$= \frac{V(x, y) - V(x, y+h)}{U\left(x, y+\frac{h}{2}\right)} \sim \frac{h}{U\left(x, y+\frac{h}{2}\right)} \cdot \frac{\delta V(x, y)}{\delta y}$$

In the network shown in Fig. 14, a cell A $(x, y)$, of the type shown in Fig. 9, connects the junction point of coordinates $x+lh$, $y+mh$ to the junction point of coordinates $x, y$.

The current flowing through this cell is:

$$i_0 = \frac{\alpha(x, y)}{r_2} \cdot V(x+lh, y+mh) + \frac{\varphi(x, y)}{r_1}$$

in which $\alpha(x, y)$ and $\varphi(x, y)$ designate the elements analogous to $\alpha(x)$ and $l(x)$ of Fig. 9.

The application of the Kirchnoff's law to junction point $x, y$ gives $i_0 = i_2 - i_1 + i_3 - i_4$ and a development in series of Mac Laurin type to the first order of $h$, of the terms $i_2 - i_1$ and $i_3 - i_4$, gives the Equation 15 in which $$a = \frac{1}{R}$$

and $$b = \frac{1}{U}$$

Of course other variations evident to those skilled in the art could be made in the above specification which was given solely by way illustration. For instance any amplifying means, such as transistors, could be used without departing from the spirit of the invention or leaving the scope thereof.

What I claim is:

1. A network for solving differential equations with $n$ variables of the type $$A_1\frac{\delta^2 V}{\delta x^2} + A_2\frac{\delta^2 V}{\delta y^2} + B_1\frac{\delta V}{\delta x} + B_2\frac{\delta V}{\delta y} + CV(x-l, y-m) + D = 0$$

wherein $A_1$, $A_2$ C and D are known functions of $x$ and $y$ and $B_1$ is proportional to $$\frac{\delta A_1}{\delta x}$$

and $B_2$ is proportional $$\frac{\delta A_2}{\delta y}$$

$l$ and $m$ being independent of $x$, V being an unknown function of $x$ and $y$, comprising:

$n$ families of chains of junction points having respective coordinates $x_1 \ldots x_n$, $y_1 \ldots y_m$ such that the coordinates of the two extreme among said junction points of each chain are values between which the above equation is to be integrated and such that the coordinates $x_p$, $x_p+1$, or $y_p$, $y_p+1$ of the consecutive other junction points of each chain differ by a fixed value $h$, which is small compared to the difference between the coordinates of said extreme junction points of each chain and is an integer submultiple of $l$ and $m$; sources of fixed potential, respectively connected to said extreme junction points; a plurality of resistors, series connecting said junction points of each chain, and the respective resistance values of which simulate the values of functions of all the coordinates identical respectively to $$\frac{1}{A_1} \text{ to } \frac{1}{A_2} \ldots$$

respectively provided by giving to said coordinates the values of the average of said coordinates of the two junction points to which each resistor is connected; a plurality of impedances, having two terminals, respectively connected by one of said terminals to said junction points; means for feeding currents from said respective other terminals to said respective junction points as a function of voltage sources the respective potentials of which are simulating respectively the term D, for $x$, $y$ ... being equal to the respective coordinates of the respective junction points; and amplifiers having an input and an output, each amplifier having its input connected to a first junction point, and its output connected for feeding in series said impedance connected to a second junction point whose coordinates differ respectively by $l$ and $m$ from the coordinates of said first junction point for providing respective feedback loops for said junction points; means for controlling the respective feedback ratio of said feedback loops; and means for measuring the respective potentials V of said junction points.

2. A network as claimed in claim 1, wherein the sources of fixed potentials connected to said extreme junction points comprise: a transformer having a primary and a secondary; a source of A.C. potential for feeding said primary; said terminals of said secondary being respectively connected to said extreme junction points; a resistor being bridge mounted between said two terminals, a point of said resistor being earthed.

3. A network as claimed in claim 1, wherein the sources of fixed potentials connected to said extreme junction points comprise: a transformer having a primary and a secondary; a source of A.C. potential for feeding said primary; the secondary having a first and a second terminal; said first terminal being earthed; a movable tap in said secondary; the second terminal and said movable tap being respectively connected to said extreme junction points.

4. In a network according to claim 1 means for measuring the respective potentials of said junction points, comprising: an electronic tube having a cathode, a control grid and anode; means for selectively feeding the potentials to be measured to said grid; a high voltage source; a first transformer having a primary having a first and second terminal, and a secondary; said anode being connected to said first terminal, said second terminal being connected to said high voltage source; a second transformer having a primary and secondary having a middle point; an A.C. voltage source for feeding said primary, said source having the same period and the same phase as the potentials to be measured; a resistor-capacitor circuit with a high time constant having a middle point; a voltage measuring device; said secondary of the second transformer, said resistor-capacitor circuit and said measuring device being parallel connected; two identical rectifiers respectively series connected with said above mentioned secondary, said middle point of said secondary of said second transformer and said middle point of said resistor-capacitor circuit being interconnected by said secondary of said first transformer.

5. A network for solving differential equations with $n$ variables of the type.

$$A_1\frac{\delta^2 V}{\delta x^2}+A_2\frac{\delta^2 V}{\delta y^2}+B_1\frac{\delta V}{\delta x}+B_2\frac{\delta V}{\delta y}+CV+D=0$$

wherein $A_1$, $A_2$ ... C and D are known functions of $x$ and $y$; $B_1$ is proportional to $$\frac{\delta A_1}{\delta x}$$

$B_2$ is proportional $$\frac{\delta A_2}{\delta y} \ldots$$

V being an unknown function of $x$ and $y$ comprising: $n$ families of chains of junction points, having respecitve coordinates such that the coordinates of the two extreme among said junction points of each chain are the values between which the above equation is to be integrated and such that the respective coordinates $x_p$, $x_{p+1}$, or $y_p$, $y_{p+1}$ of the consecutive other junction points of each chain, differ by a fixed value which is small compared to the difference beween tthe coordinates of said extreme junction points of each chain; sources of fixed potential, respectively connected to said extreme junction points, a plurality of resistors, series connecting said junction points of each chain and the respective resistance values of which simulate the values of functions of all the coordinates identical respectively to $$\frac{1}{A_1}\text{ to }\frac{1}{A_2}\ldots$$

provided by giving to said coordinates the values of the average of said coordinates of the two junction points to which each resistor is connected; a plurality of impedances, having two terminals, respectively connected by one of said terminals to said respective junction points; means for feeding currents from said respective other terminals to said respective junction points as a funciton of respective voltage sources, the respective potentials of which are simulating respectively the term D, for $x$, $y$ ... being equal to the respective coordinates of the respective junction points; and amplifiers, having an input and an output, said inputs being respectively connected to said junction points, and said outputs feeding in series respectively said impedances through said respective second terminals for providing respective feedback loops for said junction points; means for controlling the respective feedback ratios of said feedback loops; and means measuring the respective potentials V of said junction points.

6. A network for solving differential equations with one variable of the type $$A\left(\frac{d^2V}{dx^2}\right)_x+B\left(\frac{dV}{dx}\right)_x+CV(x-l)+D=0$$

wherein A, C and D are functions of $x$, B is proportional to $$\frac{dA}{dx}$$

V being an unknown function of $x$, and $l$ is a constant independent of $x$ comprising; a plurality of junction points having respective abscissae $x_1$ ... $x_n$ such that the abscissae of two extreme among said junction points are the values between which the above equation is to be integrated and such that the abscissae $x_p$ and $x_{p+1}$ of consecutive other junction points differ by a fixed value $h$, which is small compared to the difference between the abscissae of said extreme junction points and is an integer submultiple of $l$, a plurality of resistors, series connecting said junction points and the respective resistance values of which simulate the values of a function R $(x)$ identical to $$\frac{1}{A}$$

respectively provided by giving to $x$ the values of the average of the abscissae of the two junction points to which said resistors are respectively connected; a plurality of impedances, having each two terminals, respectively connected by one of said terminals to said respective junction points, means for respectively feeding current to said respective junction points, from said respective other terminals, as a function of potential sources, the respective potentials of which are simulating respectively the term D, for $x$ being equal to the abscissae of the respective junction points, and amplifiers, having an input and an output, each amplifier having said input connected to a first junction point, and said output feeding in series said impedance connected to a second junction point, whose abscissa differs by $l$ from the abscissa of said first junction point, for providing respective feedback loops for said junction points; means for controlling the respective feedback ratios of said feedback loops; and means for measuring the respective potentials V of said junction points.

7. A network for solving differential equations with one variable of the type $$A\frac{d^2V}{dx^2}+B\frac{dV}{dx}+CV+D=0$$

wherein A, C and D are known functions of $x$ and B is proportional to $$\frac{dA}{dx}$$

V being an unknown function of $x$, comprising: a plurality of junction points having respective abscissae such that the abscissae $x_1$ ... $x_n$ of the two extreme among said junction points are the values between which the above equation is to be integrated and such that the abscissae $x_p$ and $x_{p+1}$ of the consecutive other junction points, differ by a fixed value which is small compared to the difference between the abscissae of said extreme junction points; two sources of fixed potential, respectively connected to said extreme junction points; a plurality of resistors, series connecting said junction points and the respective resistance values of which simulate the values of a function R $(x)$ identical to $$\frac{1}{A}$$

respectively provided by giving to $x$ the values of the average of the abscissae of the two junction points to which each resistor is connected; a plurality of impedances, having two terminals, respectively connected by one of said terminals to said junction points; means for feeding currents from said other respective terminals to said respective junction points as a function of the respective potentials which are simulating respectively the terms D, for $x$ being equal to the abscissae of the respective junction points; and amplifiers, having an input and an output, said inputs being respectively connected to said junction points, and said outputs feeding in series respectively said impedances through their respective second terminals, for providing respective feedback loops for said junction points; means for controlling the respective feedback ratios of said feedback loops, and means for measuring the respective potentials V of said junction points.

8. A network for solving differential equations with one variable of the type $$A\frac{d^2V}{dx^2}+B\frac{dV}{dx}+CV+D=0$$

wherein A, C and D are known functions of $x$ and B is proportional to $$\frac{dA}{dx}$$

being an unknown function of $x$ comprising: a plurality of junction points having respective abscissae $x_1 \ldots x_n$ such that the abscissae of the two extreme among said junction points are the values between which the above equation is to be integrated and such that the respective abscissae $x_p$, $x_{p+1}$ of the consecutive other junction points, differ by a fixed value $h$ which is small compared to the difference between the abscissae of said extreme junction points; two sources of fixed potential, respectively connected to said extreme junction points; a plurality of resistors, series connecting said junction points and the respective resistance values of which simulate the values of a function R $(x)$ identical to $$\frac{1}{A}$$

respectively provided by giving to $x$ the values of the average of the abscissae of the two junction points to which each resistor is connected; a plurality of second resistors having two terminals respectively connected by one of said terminals to said junction points; means for feeding respective currents to said other respective terminals as a function of respective potentials which are simulating respectively the term D, for $x$ being equal to the abscissae of the respective junction points; and amplifiers having respectively an input and an output, said inputs being respectively connected to said junction points; means for respectively applying potentials provided at said outputs to said second terminals whereby feedback loops are provided for said junction points; means for controlling the respective feedback ratios of said feedback loops; and means for measuring the respective potentials V of said junction points.

9. A network according to claim 8 wherein said means for feeding said respective currents to said respective other terminals of said second resistors comprise: a single source of potentials, a plurality of taps for providing for each junction point a potential simulating the value of D at said junction point for x being equal to the abscissa of said point; for each junction point a second amplifier having an input and an output said input being connected to said tap; a transformer having a primary and a secondary; another resistor parallel connected to said secondary and series connected to said second resistor; said output being connected for feeding said primary, said primary being connected for receiving the output potential of said first amplifier.

10. A network for solving differential equations with one variable of the type $$A\frac{d^2V}{dx^2}+B\frac{dV}{dx}+CV+D=0$$

wherein A, C and D are known functions of $x$ and B is proportional to $$\frac{dA}{dx}$$

V being an unknown function of $x$, comprising: a plurality of junction points having respective abscissae $x_1 \ldots x_n$ such that the abscissae of the two extreme among said junction points are the values between which the above equation is to be integrated and such that the respective abscissae $x_p$ and $x_{p+1}$ of the consecutive other junction points differ by a fixed value $h$ which is small compared to the difference between the abscissae of said extreme junction points; two sources of fixed potential, respectively connected to said extreme junction points; a plurality of resistors, series connecting said junction points, the respective resistance values of which simulate the values of a function R $(x)$ identical to $$\frac{1}{A}$$

respectively provided by giving to $x$ the respective values of the average of the abscissae of the two junction points to which said resistors are respectively connected; a plurality of other resistors, having respectively a first and a second terminal, respectively connected by said first terminals to said junction points; a plurality of transformers, having respectively a primary and a secondary; sources of alternating voltage, respectively connected to said primaries, said secondaries being respectively series connected to said resistors by said second terminals; amplifiers having respective outputs and inputs, said inputs being respectively connected to said junction points; potentiometers having a movable tap, an earthed terminal and a terminal connected to said output, said tap being series connected to said secondaries; and means for measuring the respective potentials V of said junction points.

11. A network for solving differential equations with one variable of the type $$A\left(\frac{d^2V}{dx^2}\right)_x+B\left(\frac{dV}{dx}\right)_x+CV(x-l)+D=0$$

wherein A, C and D are known functions of $x$, B is proportional to $$\frac{dA}{dx}$$

V being an unknown function of $x$, and $l$ is a constant independent of $x$ comprising: a plurality of junction points having respective abscissae $x_1 \ldots x_n$ such that the respective abscissae of two extreme among said junction points are the values between which the above equation is to be integrated and such that the respective abscissae $x_p$ and $x_{p+1}$ of consecutive other junction points differ by a fixed value $h$, which is small compared to the difference between the abscissae of said extreme junction points and is an integer submultiple of $l$, a plurality of resistors series connecting said junction points and the respective resistance values of which simulate the values of a function R $(x)$ identical to $$\frac{1}{A}$$

respectively provided by giving to $x$ the values of the average of the abscissae of the two junction points to which said resistors are respectively connected; a plurality of capacitors, having two terminals respectively connected by one of said terminals to a first of said junction points; a first plurality of electronic tubes having respectively a cathode, a control grid and an anode, said anodes being respectively connected to other terminals of said capacitors, means for feeding to said grids potentials respectively simulating the value D for $x$ being equal to the abscissa of said junction point; a second plurality of resistors, said cathodes being respectively earthed by a resistor of said second plurality; a second plurality of electronic tubes, having respectively a cathode, a control grid and an anode, means for connecting said anodes respectively to said other terminals of said capacitors; a third plurality of resistors, said cathodes being earthed respectively by resistors of said third plurality; a plurality of potentiometers for feeding respectively said control grids, said potentiometers having each a first and a second terminal, said first terminal being earthed, said second terminal being connected to a second junction point, the respective abscissae of said first and said second junction point differing by $l$, a plurality of choke coils connecting respectively said anodes of said first and second plurality of tubes to sources of high voltage, and means for measuring the respective potentials V of said junction points.

12. A network according to claim 11, where $l$ is equal to zero.

13. A network according to claim 11, wherein said means for feeding to said grids said potentials simulating D comprise respectively transformers for shifting by 180° the phase of said potentials.

References Cited in the file of this patent

UNITED STATES PATENTS

| | | |
|---|---|---|
| 2,461,738 | Johnson | Feb. 15, 1949 |
| 2,569,646 | Wade et al. | Oct. 2, 1951 |

OTHER REFERENCES

MacNee: "An Electronic Differential Analyzer" Proceedings of the IRE vol. 37 No. 11 November 1949 pp. 1315–1324.

British Journal of Applied Physics (1) (Liebmann) 1950 pp. 92–102.

British Journal of Applied Physics (Karplus) (vol. 6) No. 10, Oct. 1955, pp. 356 and 357.